(12) United States Patent
Miyazawa et al.

(10) Patent No.: US 7,749,652 B2
(45) Date of Patent: Jul. 6, 2010

(54) LEAD AND NONAQUEOUS ELECTROLYTE BATTERY INCLUDING SAME

(75) Inventors: Keitaro Miyazawa, Kanuma (JP); Kousuke Tanaka, Kanuma (JP); Hideo Kuroda, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 771 days.

(21) Appl. No.: 11/663,754

(22) PCT Filed: Sep. 26, 2005

(86) PCT No.: PCT/JP2005/017589

§ 371 (c)(1),
(2), (4) Date: Mar. 26, 2007

(87) PCT Pub. No.: WO2006/035691

PCT Pub. Date: Apr. 6, 2006

(65) Prior Publication Data

US 2008/0254360 A1 Oct. 16, 2008

(30) Foreign Application Priority Data

Sep. 30, 2004 (JP) ............................. 2004-286740

(51) Int. Cl.
*H01M 2/08* (2006.01)
*H01M 2/00* (2006.01)
(52) U.S. Cl. ...................... 429/184; 429/163
(58) Field of Classification Search ............... 429/184, 429/179, 163
See application file for complete search history.

(56) References Cited

U.S. PATENT DOCUMENTS

2004/0224225 A1    11/2004   Yamashita et al.

FOREIGN PATENT DOCUMENTS

| JP | 06-146003 | 5/1994 |
| JP | 2000-000519 | 1/2000 |
| JP | 3505905 | 12/2003 |

OTHER PUBLICATIONS

Koichi Hatanaka et al., "Coating adhesion and corrosion residence of polyacrylic acid-zirconium composite treated aluminum", Keikinzoku, vol. 40, No. 4, 1990, pp. 298 to 304.

(Continued)

*Primary Examiner*—Patrick Ryan
*Assistant Examiner*—Thomas H. Parsons
(74) *Attorney, Agent, or Firm*—Global IP Counselors, LLP

(57) ABSTRACT

A lead and a nonaqueous electrolyte battery including the lead that is given a non-chromium surface treatment and have excellent resistance to hydrofluoric acid. The lead includes: (1) a metal lead made of nickel, nickel plated copper, or copper; (2) a composite coating layer that is formed on a portion of the surface of the metal lead that is hermetically attached to the package, the composite coating layer being formed by applying a treatment liquid that contains a salt of zirconium, a salt of titanium, or a salt of molybdenum and a resin component containing polyacrylic acid; and (3) an insulator that is arranged outside the composite coating layer and hermetically attached to the package. The nonaqueous electrolyte battery having the lead connected to positive or negative electrode of the nonaqueous electrolyte battery.

4 Claims, 2 Drawing Sheets

OTHER PUBLICATIONS

Masanobu Fukui et al., "Yuki-Muki Fukugo Himaku no Tomaku Micchakusei", The Japan Institute of Light Metals Dai 74 Kai Shunki Taikai Koen Gaiyo, Apr. 8, 1988, pp. 61 to 62.

An article on homepage of JPO website dated Mar. 28, 2003 (Prior Art cited in the specification) title, volume-issue numbers, author not available.

LEAD AND NONAQUEOUS ELECTROLYTE BATTERY INCLUDING SAME

TECHNICAL FIELD

The present invention relates to a lead for a nonaqueous electrolyte battery having a package encapsulating a positive electrode, a negative electrode, and an electrolytic solution, the lead to be connected to each of the electrodes and to extend to the outside from the package. The present invention also relates to a nonaqueous electrolyte battery having such lead.

BACKGROUND ART

As electronic devices become smaller in size, there is also a demand for batteries that are smaller in size and lighter in weight to serve as power sources for the electronic devices. Moreover, there is also a demand for batteries having higher energy densities and higher energy efficiencies. Lithium ion batteries and other nonaqueous electrolyte batteries are increasingly expected to meet such demands. Japanese Patent No. 3505905 discloses a nonaqueous electrolyte battery in which a positive electrode, a negative electrode, and an electrolytic solution are encapsulated in, for example, a bag-like package made of a laminated film containing a metal foil, and leads that are connected to the electrodes extend to the outside of the package.

Each of the leads connected to the positive or negative electrode has an insulator covering thereof at a portion where it is attached to the package to prevent electrical short circuiting between the leads and the metal foil of the laminated film. Also, at the portions, the leads are fused to prescribed positions of a border part of the package that is formed by fusing the laminated films, such that the leads extend to the outside of the package while maintaining the hermetically sealed state of the package.

The insulator used to cover each of the leads is made up of two layers: an inner insulation layer and an outer insulation layer that has a higher melting point than the inner insulation layer and does not melt at the temperature at which the laminated films are heat-sealed. The insulator is bonded to each of the metal leads at a portion where each of the leads is attached to the package, by heating and melting the inner insulation layer. The leads having insulators are arranged in lead passage portions of the package, such that the insulators are positioned at seal portions of the edge of the laminated film. Then, the edge of the laminated film is sealed by heat sealing. The outer insulation layers of the insulators do not melt at the temperature at which the heat sealing proceeds. Thus, the metal leads do not become exposed through the insulators during the heat sealing. As a result, electrical short circuiting does not occur between the metal leads and the metal foil inside the laminated film. The metal lead is made of aluminum, nickel (including nickel plating), or copper.

If the hermetic adhesion between the seal portion of the laminated film and the lead at a portion where the lead is attached to the package is insufficient, however, moisture will penetrate the inside of the battery from the outside and reacts with the electrolytic acid inside the battery, thereby producing hydrofluoric acid. In such cases, even though the surface of the metal lead is hermetically sealed by the insulator at the lead passage portion of the package, the surface of the metal lead will gradually corrode over a long period of time due to the hydrofluoric acid, and the portion of the metal lead to which the insulator is bonded will collapse. As a result, the airtightness of the package will be degraded and the battery characteristics will decline.

One method of solving such problem is to cover with a chemical conversion layer a surface of a metal lead (tab) at a portion to be sealed with the insulator, as shown in Japanese Patent Application Publication No. 2002-216741. Japanese Patent Application Publication No. 2002-216741 discloses a typical chromate phosphate treatment in which a coating is chemically created using an aqueous chromic acid solution containing a phosphate salt. It also discloses forming a chemical conversion coating on a lead by immersing the lead in a chemical conversion solution that includes a resin containing a phenol resin and a metal salt such as titanium, zircon, or other metal. In this manner, chromium-based chemical conversion treatments are effective as a chemical conversion treatment for imparting resistance against hydrofluoric acid, and have been used in many different fields. However, due to environmental pollution concerns, chromium-free chemical conversion treatments are being developed in various fields. It is anticipated that there will be a demand to develop chemical conversion treatments that are completely free of chromium in the future.

In fields other than the field of leads for nonaqueous electrolyte batteries, there have already been many attempts for practical use of salts containing metals such as zirconia-based and titanium-based metals instead of chromium as materials for making coatings. There have also been attempts to use a mixture of such salt with polyacrylic acid as a material for making coatings. Such coatings are reported to have satisfactory adhesion characteristics when applied to aluminum and also to be effective from the standpoint of corrosion resistance (based on an article on homepage of JPO website dated 28 Mar. 2003).

Patent Document 1: Japanese Patent No. 3505905

Patent Document 2: Japanese Patent Application Publication No. 2002-216741

DISCLOSURE OF INVENTION

Problem to be Solved by the Invention

The object of the present invention is to provide a lead and a nonaqueous electrolyte battery including the lead that is given a non-chromium surface treatment and have superior resistance against hydrofluoric acid.

Means for Solving the Problem

To achieve the object, a lead for a nonaqueous electrolyte battery in which a positive electrode, a negative electrode, and an electrolytic solution are encapsulated in a package made of laminated films containing a metal foil is provided. The lead includes: (1) a metal lead made of nickel, nickel plated copper, or copper; (2) a composite coating layer that is formed on a surface of the metal lead at a portion where the lead is hermetically attached to the package by applying a treatment liquid that contains a salt of zirconium, a salt of titanium, or a salt of molybdenum, and a resin component containing polyacrylic acid; and (3) an insulator that is arranged on the outside of the composite coating layer and hermetically attached to the package. Also provided is a nonaqueous electrolyte battery having: a package made of laminated films including a metal foil; a positive electrode, a negative electrode, and an electrolytic solution encapsulated in the package; and a lead according to the present invention, the lead being connected to the positive electrode or the negative electrode, respectively, and arranged to extend to the outside of the package.

ADVANTAGE OF THE INVENTION

The present invention makes it possible to form on the surface of a lead a composite coating layer that does not contain either of hexavalent chromium (chromium VI), which is a known environmental pollutant, or trivalent chromium (chromium III), the use of which is likely to be restricted in the future. By forming such composite coating layer, the lead can be sealed to have a superior resistance to hydrofluoric acid. Furthermore, a nonaqueous electrolyte battery that does not leak and therefore has stable characteristics and a long service life can be realized.

BRIEF DESCRIPTION OF DRAWINGS

FIG. 2 illustrates the nonaqueous electrolyte battery and leads shown in FIG. 1.

REFERENCE NUMERALS

Figure 1:
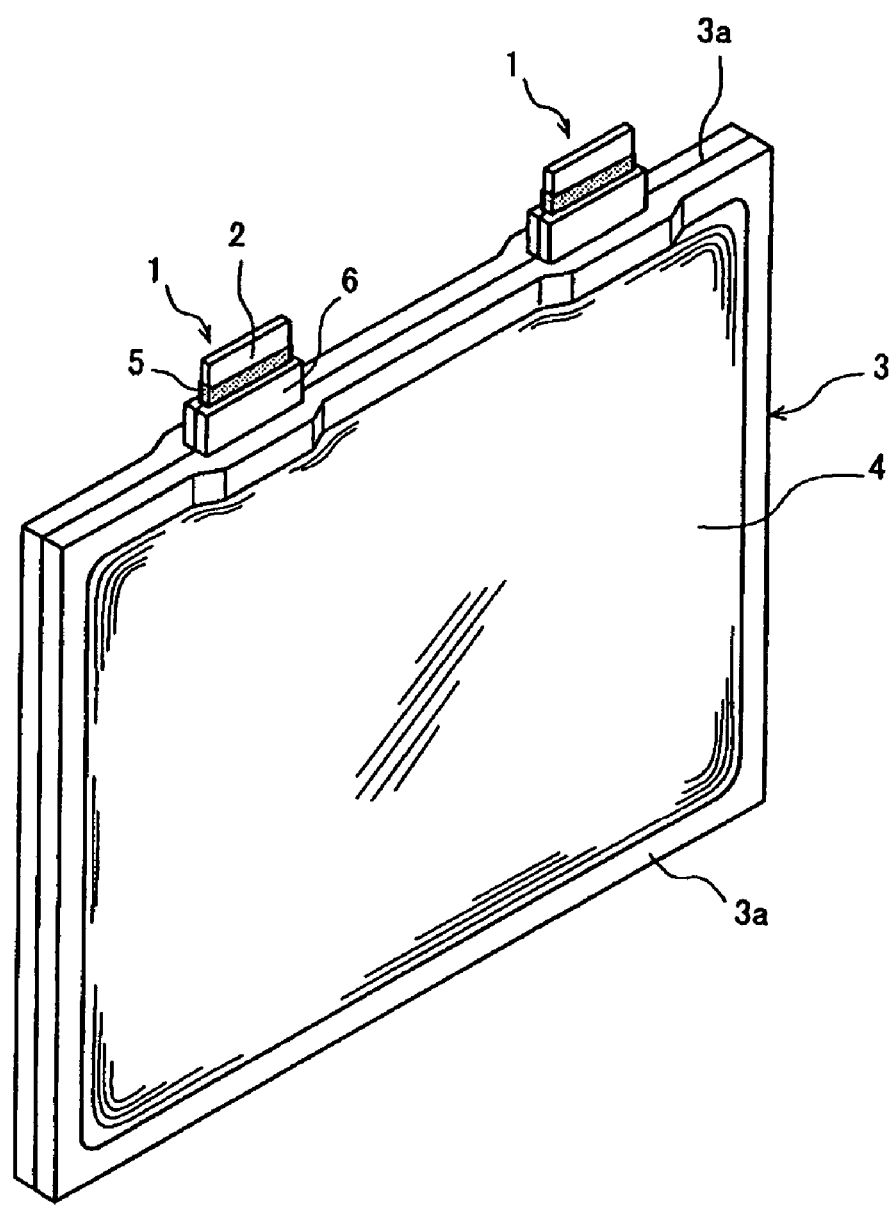
FIG. 1 is a perspective view of an embodiment of a nonaqueous electrolyte battery according to the present invention.

1 - - - lead, 2 - - - metal lead, 3 - - - package, 3a - - - seal portion, 4 - - - laminated film, 4a - - - metal foil, 5 - - - composite coating layer, 6 - - - insulator, 7 - - - adhesive layer, 8 - - - insulation layer, 9 - - - positive electrode, 9' - - - negative electrode, 10 - - - separator, 11, 11' - - - electrode conductor, 12, 12' - - - active material layer

BEST MODE FOR CARRYING OUT THE INVENTION

Embodiments of the present invention will now be described with reference to the drawings. The drawings are provided merely for the purpose of illustrating the invention and are not intended to limit the scope of the invention. In the drawings, in order to avoid redundancy in the explanations, identical parts are indicated with the same reference numerals. The drawings are not necessarily drawn to scale.

FIG. 1 is a perspective view of an embodiment of a nonaqueous electrolyte battery according to the present invention. This nonaqueous electrolyte battery is a thin-type battery. A pair of leads 1, each of which is composed of a metal lead 2 and an insulator 6 covering the metal lead 2 at a portion where the lead 1 is attached to the package 3, are arranged to extend to the outside of a package 3 through seal portions 3a of a package 3. The package 3 is a bag-like member obtained by thermally fusing the edge of the package 3 to form the seal portion 3a. A single electrochemical cell which includes a positive electrode, a negative electrode, a separator, and a nonaqueous electrolytic solution, containing an electrolyte (e.g., a lithium compound) dissolved in a nonaqueous solvent (e.g., an organic solvent), is hermetically enclosed inside the package 3.

A composite coating layer 5 is formed using a chemical conversion treatment on the metal lead 2 on the surface of at least a portion where the lead 1 will be hermetically attached to a laminated film 4 and the outside surface of the composite coating layer 5 is covered with and insulated by the insulator 6. The laminated films 4 are hermetically attached to the outside surface of the insulator 6.

Figure 2A:
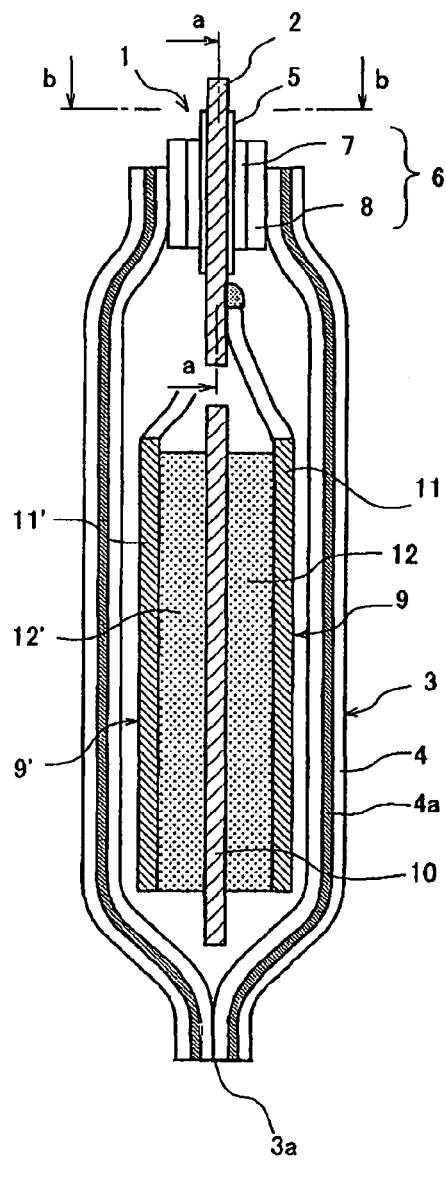
FIG. 2A is a cross sectional view.

FIG. 2 provides views illustrating the nonaqueous electrolyte battery and the leads shown in FIG. 1. FIG. 2A is a cross sectional view of the nonaqueous electrolyte battery as viewed in a direction orthogonal to the thickness direction of the nonaqueous electrolyte battery. The package 3 is made of the laminated films 4 which include a metal foil 4a inside a resin film. More specifically, the laminated films 4 include an inner layer film, an outer layer film, and a metal foil 4a that is made of aluminum, copper, stainless steel, or other metal and is sandwiched between the inner layer film and the outer layer film, whereby the hermetic property with respect to the electrolytic solution encapsulated in the package 3 is increased.

The laminated films 4 may be a laminated material made up of three to five layers. The innermost layer of the laminated films 4 is made of a material such as an acid modified polyolefin (e.g., maleic anhydride modified polyethylen), which does not dissolve in the electrolytic solution and prevents the electrolytic solution from leaking through the seal portion. The outermost film layer is made of a material such as polyethylene terephthalate, which protects the internal metal foil 4a from external damage.

The electrolyte encapsulated inside the package 3 is a nonaqueous electrolytic solution of $LiClO_4$, $LiBF_4$, $LiPF_6$, $LiAsF_6$ or other material dissolved in organic solvents such as propylene carbonate, ethylene carbonate, diethyl carbonate, dimethyl carbonate, 1,2-dimethoxyethane, or tetrahydrofuran. The electrolyte can also be a solid electrolyte that is lithium ion conductive.

Each electrode includes a metal base material that is called a "collector" and made of a metal foil or expanded metal, and an active material layer that is provided over the base material. More specifically, the positive electrode 9 includes an aluminum electrode conductor 11 and an active material layer 12 that is made of a reduced oxide powder, a carbon powder, and a binder and provided over the electrode conductor 11. The negative electrode 9' includes an electrode conductor 11' of copper or nickel and an active material layer 12' that is made of carbon powders and a binder and provided over the electrode conductor 11'. A separator 10 is arranged between the positive electrode 9 and the negative electrode 9'. The separator 10 is a polyolefin-based porous membrane that is electrically insulating and ion conductive.

A connection piece is formed integrally with each electrode conductor 11, 11', such that each connection piece is connected to the corresponding metal lead 2 with a spot weld or an ultrasonic weld. The positive electrode 9 and the negative electrode 9' are thus electrically connected to the outside. Since the metal lead 2 connected to the positive electrode 9 reaches high positive electric potentials, it is preferably made of aluminum (like the electrode conductor 11) or an aluminum alloy in order to prevent it from dissolving in the electrolytic solution contacting it. The metal lead 2 connected to the negative electrode 9' is preferably made of copper or nickel (like the electrode conductor 11') or an alloy of copper or nickel in order to make it resistant to corrosion by lithium, alloying with lithium, and dissolving at high electric potentials, because excessive discharge causes lithium deposition on it and it reaches high electric potentials as a result of overcharging.

A single strand of either a round conductor or a flat rectangular conductor can be used for the metal lead 2. However, when a round conductor is used in a large-capacity battery, the diameter of the conductor must be large, and there is the possibility that the hermetic property at a portion where the lead is attached to the package will be compromised. Therefore, a flat rectangular conductor in which the width can be increased instead of increasing the thickness substantially can be, even when the battery capacity is large, passed through the package 3 without compromising the hermetic property. Additionally, regarding the welding of the electrode conductors 11, 11' to the metal leads 2, connections with superior reliability can be accomplished by using the leads with flat rectangular conductors because larger contact surface areas can be obtained.

Figure 2B:
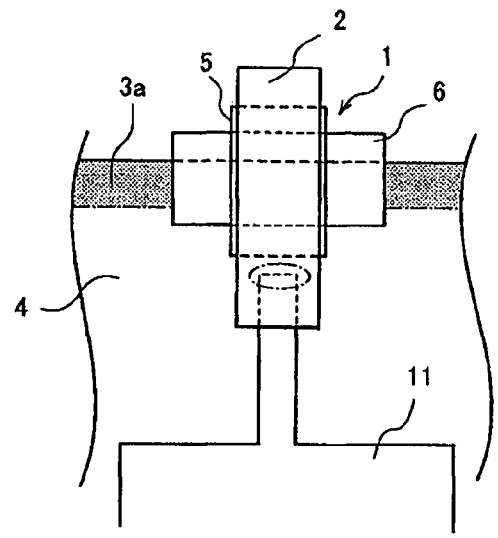
FIG. 2B is a cross sectional view taken along the section line a-a of FIG. 2A.
Figure 2C:
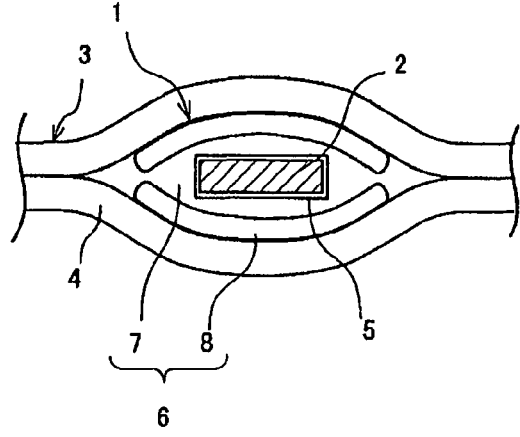
FIG. 2C is a cross sectional view taken along the section line b-b of FIG. 2A.

FIG. 2B is a cross sectional view taken along the section line a-a of FIG. 2A and FIG. 2C is a cross sectional view taken along the section line b-b of FIG. 2A. As shown in FIG. 2B and FIG. 2C, it is preferable for the insulators 6, which covers each metal lead 2 at a portion where the lead 1 is attached to the package 3 and serves to electrically insulate the metal lead 2 from the metal foil 4a of the laminated film 4, to be made of two layers, i.e., an adhesive layer 7 and an insulation layer. The adhesive layer 7 is made of a resin material having a comparatively low melting temperature and fused to the composite coating layer 5, which will be discussed later, to hermetically attach the insulation layer 8 to the composite coating layer 5 which is formed on the surface of the metal lead 2. The adhesive layer 7 is made of, for example, a thermoplastic polyolefin resin, preferably a low-density polyethylene or an acid modified low-density polyethylene (which has, for example, a thickness of 40 μm and a melting point of 110° C.) and is thermally fused to the composite coating layer 5 formed on the metal lead 2.

The insulation layer 8 is made of a resin material that does not melt at the temperature at which the package 3 is heat-sealed. The insulation layer 8 is fused to the package 3 such that the metal lead 2 extends out of the package 3 in a hermetically sealed fashion. The insulation layer 8 is made of, for example, a cross-linked polyolefin resin, preferably a cross-linked low-density polyethylene or an ethylene-vinyl alcohol polymer (which has, for example, an ethylene ratio of 44%, a thickness of 100 μm, and a melting point of 165° C.). If the innermost film layer of the package 3 is made of an acid modified low-density polyethylene, the seal portion 3a will be heat sealed at about 110° C. but the insulation layer 8 will not melt at this heat sealing temperature. Thus, the metal lead 2 can be electrically insulated from the metal foil 4a of the laminated film 4 at the portion where the lead 1 is attached to the package 3.

In this embodiment, in order to prevent the metal leads 2 from being corroded by hydrofluoric acid, the surface of the nickel, nickel plated copper, or copper from which each metal lead 2 is made is treated with a composite coating layer, which includes a resin component consisting of polyacrylic acid or a resin component containing polyacrylic acid, and a metal salt of zirconium, titanium, or molybdenum. This composite coating layer increases the resistance of the leads against hydrofluoric acid. The metal salt used herein does not contain chromium, which is a known the environmental pollutant. A zirconium salt can be zirconate fluoride, zirconium carbonate, or zirconium phosphate. An organic titanium chelate can be used as a titanium salt. A salt of molybdic acid can be used as a molybdenum salt.

It was ascertained that when a resin component of the composite coating layer 5 is obtained by using a treatment liquid containing not only polyacrylite acid but also polyacrylic acid amide, the composite coating layer 5 had a better resistance to hydrofluoric acid and was more useful than that obtained by using a treatment liquid containing polyacrylic acid alone.

It is preferable for the composite coating layer 5 to contain 1 to 200 mg/m$^2$ of the resin component and 0.5 to 50 mg/m$^2$ of the zirconium salt, titanium salt, or molybdenum salt. If the resin component content is below 1 mg/m$^2$, the pliability of the composite coating layer 5 will decline and cracking will be more likely to occur. Conversely, if the resin component content exceeds 200 mg/m$^2$, the adhesion between the composite coating layer 5 and the insulator 6 (adhesive layer 7) will decline. Meanwhile, the resistance against hydrofluoric acid will be insufficient if the metal salt content is below 0.5 mg/m$^2$ and the coating layer will be brittle if the metal salt content exceeds 50 mg/m$^2$.

Regarding to the composite coating layer 5, it is preferable for the ratio of the resin component content to the zirconium, titanium, or molybdenum salt content to be between 1:3 and 6:1. If the ratio of the resin component content to the metal salt content falls below 1:3, the resin component will envelop the metal salt, causing the adhesion strength to decline, and making it difficult to obtain a sufficient hydrofluoric acid resistance. Conversely, if the ratio is above 6:1, the relative quantity of metal salt in the composite coating layer 5 will be small and, again, it will be impossible to obtain a sufficient hydrofluoric acid resistance.

Metal leads 2 are generally made of aluminum, nickel, nickel-plated copper, or copper. It is ascertained that the composite coating layer according to the present invention is used effectively to the metal lead 2 made of nickel, nickel-plated copper, or copper.

Table 1 shows data for Working Examples 1 to 5 according to the present invention and for Comparative Examples 1 to 5. More specifically, the table shows the lead material, the composition of the chemical treatment liquid, which includes a resin component and a metal salt, that is used to make the composite coating layer, and the ratio of the resin component content to the metal salt content for each working example and comparative example. In all of the examples, a metal foil having a thickness of 80 μm was used as the metal lead. In each of Working Examples 1 to 5 and Comparative Examples 4 and 5, the chemical conversion treatment liquid having the compositions ratio indicated in Table 1 was applied to both surfaces of the metal foil at a thickness of 5 g/m$^2$ (wet) using a gravure coater. The treatment liquid was then dried by heating such that the metal surface became 100° C. In Comparative Examples 1 to 3, a composite coating layer was not provided on the metal foil. In Working Examples 1 to 5 and Comparative Examples 4 and 5, the resin component of the chemical conversion treatment liquid was polyacrylic acid and polyacrylic acid amide and the metal salt was a zirconium salt (zirconium hydroxide carbonate ($(NH_4)_3Zr(OH)(CO_3)_3$)) or a titanium salt (organic titanium chelate).

TABLE 1

| | Lead material | Resin component mg/m$^2$ | Metal salt mg/m$_2$ | Ratio |
|---|---|---|---|---|
| Working Example 1 | Aluminum | 20 | Zirconium salt, 20 | 1/1 |
| Working Example 2 | Nickel | 100 | Zirconium salt, 20 | 5/1 |
| Working Example 3 | Nickel | 20 | Titanium salt, 20 | 1/1 |
| Working Example 4 | Nickel-plated copper | 20 | Zirconium salt, 20 | 1/1 |
| Working Example 5 | Copper | 20 | Zirconium salt, 20 | 1/1 |
| Comparative Example 1 | Aluminum | — | — | — |
| Comparative Example 2 | Nickel-plated copper | — | — | — |
| Comparative Example 3 | Copper | — | — | — |

TABLE 1-continued

| | Lead material | Resin component mg/m$^2$ | Metal salt mg/m$_2$ | Ratio |
|---|---|---|---|---|
| Comparative Example 4 | Nickel | 0.5 | Zirconium salt, 20 | 1/40 |
| Comparative Example 5 | Nickel | 3.0 | Zirconium salt, 0.4 | 7/1 |

Next, the metal foil of each example was slit to a width of 5 mm. Then, an insulator having an adhesive layer of a thermoplastic polyolefin resin and an insulation layer of a cross-linked polyolefin resin was thermally fused to the metal foil so as to form a lead. The lead was then immersed in an electrolytic solution (in which 1 mole of hexafluorophosphate was added to a liquid that contains, at a ratio of 1:1:1, ethylene carbonate, diethyl carbonate, and dimethyl carbonate) and stored in a constant temperature container at 80° C. for four weeks. The leads were visually inspected for exfoliation of the insulator from the metal lead.

TABLE 2

| | % Exfoliation after 3 days | % Exfoliation after 1 week | % Exfoliation after 2 weeks | % Exfoliation after 3 weeks | % Exfoliation after 4 weeks |
|---|---|---|---|---|---|
| Working Example 1 | 0 | 0 | 0 | 0 | 0 |
| Working Example 2 | 0 | 0 | 0 | 0 | 0 |
| Working Example 3 | 0 | 0 | 0 | 0 | 0 |
| Working Example 4 | 0 | 0 | 0 | 0 | 0 |
| Working Example 5 | 0 | 0 | 0 | 0 | 0 |
| Comparative Example 1 | 0 | 80 | 100 | 100 | 100 |
| Comparative Example 2 | 0 | 80 | 100 | 100 | 100 |
| Comparative Example 3 | 0 | 100 | 100 | 100 | 100 |
| Comparative Example 4 | 0 | 0 | 10 | 50 | 80 |
| Comparative Example 5 | 0 | 0 | 25 | 80 | 100 |

As a result, as shown in Table 2, excellent results with no exfoliation at all were obtained with Working Examples 1 to 5. Conversely, exfoliation of the insulator occurred after one week on 80% or more of the lead in Comparative Examples 1 to 3, in which composite coating layers were not provided. After two weeks, exfoliation occurred on the leads of all of these Comparative Examples. This result clearly demonstrates that the resistance against hydrofluoric acid is insufficient when an insulator alone is hermetically attached to the metal lead in a hermetically sealed manner without treating the metal lead in any way. Moreover, in Comparative Examples 4 and 5, exfoliation of the insulator occurred on 10 to 25% of the lead after two weeks, and 80% or more of the lead after four weeks. This result indicates that even if a composite coating layer is provided, electrolyte leakage resulting from corrosion caused by hydrofluoric acid could occur after a long period of use if the ratio of the resin component content to the metal salt content in the composite coating layer is below or above the prescribed values.

All of the disclosures made in the specification, claims, drawings, and abstract of Japanese Patent Application No. 2004-286740 (filed Sep. 30, 2004) are incorporated herein by reference.

INDUSTRIAL APPLICABILITY

The present invention makes it possible to form on the surface of a lead a composite coating layer that does not contain either hexavalent chromium (chromium VI), which is an environmental pollutant, and trivalent chromium (chromium III), which is likely to be restricted in the future. By forming such composite coating layer, the lead can be sealed in such a fashion that superior resistance against hydrofluoric acid is obtained and a nonaqueous electrolyte battery that does not leak, has stable characteristics, and has a long service life can be achieved.

What is claimed is:

1. A lead for a nonaqueous electrolyte battery in which a positive electrode, a negative electrode, and an electrolytic solution are encapsulated in a package that is made of laminated films containing a metal foil, the lead comprising:
   (1) a metal lead made of nickel, nickel plated copper, or copper;
   (2) a composite coating layer that is formed on a surface of the metal lead at a portion where the lead is hermetically attached to the package by applying a treatment liquid that includes a salt of zirconium, a salt of titanium, or a salt of molybdenum, and a resin component containing polyacrylic acid and a polyacrylic acid amide; and
   (3) an insulator that is arranged outside the composite coating layer and hermetically attached to the package.

2. A lead for a nonaqueous electrolyte battery as recited in claim 1, wherein
   the composite coating layer contains 1 to 200 mg/m$^2$ of the resin component, and 0.5 to 50 mg/m$^2$ of the salt of zirconium, titanium, or molybdenum.

3. A lead for a nonaqueous electrolyte battery as recited in claim 2, wherein
   a ratio of the resin component to the salt of zirconium, titanium, or molybdenum is from 1:3 to 6:1.

4. A nonaqueous electrolyte battery comprising
   a package made of laminated films containing a metal foil;
   a positive electrode, a negative electrode, and an electrolytic solution that are encapsulated in the package; and
   leads that are respectively connected to the positive electrode and the negative electrode, and arranged to extend to outside of the package,
   at least one of said leads including:
   (1) a metal lead made of nickel, nickel plated copper, or copper,
   (2) a composite coating layer that is formed on a surface of the metal lead at a portion where the metal lead is hermetically attached to the package by applying a treatment liquid that contains a salt of zirconium, a salt of titanium, or a salt of molybdenum, and a resin component containing polyacrylic acid and a polyacrylic acid amide; and
   (3) an insulator that is arranged outside the composite coating layer and hermetically attached to the package.

* * * * *